(12) United States Patent
Dunavin

(10) Patent No.: US 7,434,819 B1
(45) Date of Patent: Oct. 14, 2008

(54) PORTABLE WORK AREA

(76) Inventor: Brian S. Dunavin, 2510 N. Highway 175, Lot 818, Seagoville, TX (US) 75159

( * ) Notice: Subject to any disclaimer, the term of this patent is extended or adjusted under 35 U.S.C. 154(b) by 0 days.

(21) Appl. No.: 11/033,786

(22) Filed: Jan. 12, 2005

(51) Int. Cl.
B62B 3/00 (2006.01)
(52) U.S. Cl. .................. 280/47.35; 280/47.34; 144/285
(58) Field of Classification Search ............... 280/79.2, 280/79.11, 47.34, 47.35, 32.5, 32.6, 47.36, 280/47.371, 47.38, 651, 652, 656, 659; 144/285, 144/286.1, 287
See application file for complete search history.

(56) References Cited

U.S. PATENT DOCUMENTS

| | | | | |
|---|---|---|---|---|
| 1,660,521 A * | 2/1928 | Nordgren | .................. | 211/70.6 |
| 2,069,476 A * | 2/1937 | Keil | ............. | 280/32.5 |
| 2,525,208 A * | 10/1950 | Clink | ......................... | 312/107 |
| 3,099,398 A | 7/1963 | Croteau | | |
| 3,118,685 A * | 1/1964 | Jordan | ..................... | 280/47.19 |
| 4,338,987 A * | 7/1982 | Miles | ......................... | 144/285 |
| 4,466,628 A * | 8/1984 | Zerver | ..................... | 280/47.35 |
| 4,733,703 A | 3/1988 | Cimino | | |
| D295,099 S * | 4/1988 | Gallaugher et al. | .......... | D34/17 |
| 4,953,601 A * | 9/1990 | Herdies | ....................... | 144/285 |
| 5,224,531 A | 7/1993 | Blohm | | |
| 5,344,339 A * | 9/1994 | Cheslock | ..................... | 439/501 |
| 5,378,005 A * | 1/1995 | Norton | .................... | 280/47.26 |
| 5,452,908 A * | 9/1995 | Bencic | ..................... | 280/47.35 |
| 5,588,659 A * | 12/1996 | Boes et al. | ............... | 280/47.19 |
| 5,733,011 A * | 3/1998 | Young et al. | ........... | 297/423.11 |
| 5,876,047 A * | 3/1999 | Dennis | ..................... | 280/47.35 |
| 5,893,572 A | 4/1999 | Parks | | |
| 5,951,129 A | 9/1999 | Stein | | |
| 6,193,247 B1 * | 2/2001 | Spear et al. | ............ | 280/33.998 |
| 6,279,928 B1 * | 8/2001 | Biggs, Sr. | ............... | 280/47.19 |
| 6,520,513 B2 * | 2/2003 | Presley-Mays | ............. | 280/32.5 |
| 6,530,583 B1 * | 3/2003 | Mueller | .................... | 280/47.18 |
| 6,578,938 B2 * | 6/2003 | Norman et al. | ............. | 312/290 |
| 6,688,615 B2 * | 2/2004 | Chen | ........................ | 280/47.35 |
| 6,857,644 B2 * | 2/2005 | Hsiao | ......................... | 280/79.2 |
| 7,032,908 B2 * | 4/2006 | Melvin | ....................... | 280/32.6 |
| 2003/0015851 A1 | 1/2003 | Hahn | | |

* cited by examiner

Primary Examiner—Christopher P. Ellis
Assistant Examiner—John D Walters
(74) Attorney, Agent, or Firm—Lawrence J. Gibney, Jr.

(57) ABSTRACT

A device, which allows its user to store and organize tools and materials and easily transport them to and from a desired location. The device has wheels and handles for easy pulling. A padded area is provided so that the user can sit or kneel on the device and the work surface can be elevated for the convenience of the user.

10 Claims, 3 Drawing Sheets

PORTABLE WORK AREA

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

It is often the case when using tools that the work area is far away from the tool chest and the tool chest cannot be moved. Alternatively, a common toolbox often is not large enough to hold larger tools. When working on a project, a comfortable place to sit is not often nearby. Also, a flat surface is desirable when working with items to be cut. A device, which satisfied these design features would improve working conditions and the efficiency of the worker.

A. Field of the Invention

This invention relates to the storage and transportation of tools and providing a flat working surface.

B. Prior Art

There exists prior art, which contains one or two of these desired features. However, a container with all of these features would fill the complete needs of the user of tools.

The Croteau (U.S. Pat. No. 3,099,398) patent teaches a small toolbox which has a stand. Stein (U.S. Pat. No. 5,951,129), Blohm (U.S. Pat. No. 5,224,531), Cimino (U.S. Pat. No. 4,733,703), and Parks (U.S. Pat. No. 5,893,572) each teach a tool chest with wheels. These patents have different structures, but each one has approximately the same height.

The present invention allows its user to comfortably transport larger tools and organize smaller tools. It provides a comfortable seating or kneeling area as well as a flat workbench. Additionally, the height of the flat surface can be adjusted for convenience.

BRIEF SUMMARY OF THE INVENTION

The present invention is a mobile tool chest, workbench, and seating area. It rests on sturdy wheels, but can be tipped on its end to sit on rubber boots attached on one of the sides. The invention has a shape with one container having a wide and a short dimension. Wheels will be attached under this container. A padded seat will act as a lid for this container.

Another container has a longer and thinner dimension and sits on smaller swivel wheels. The lid for this container acts as a table and workbench. Handles are located at the open end of the long container to allow the user to pull the invention.

Alternative designs for the invention install drawers into the sides of the containers in order to better organize tools. Additionally an alternative embodiment would include the capability for the workbench to be elevated to chest level to avoid the problem of the user constantly bending over to complete a task.

The materials used to construct the invention will be durable and light. The height of the invention will be only high enough to allow the user to sit or kneel comfortably on the padded seat to accomplish a task.

DETAILED DESCRIPTION OF THE EMBODIMENTS

Figure 2:
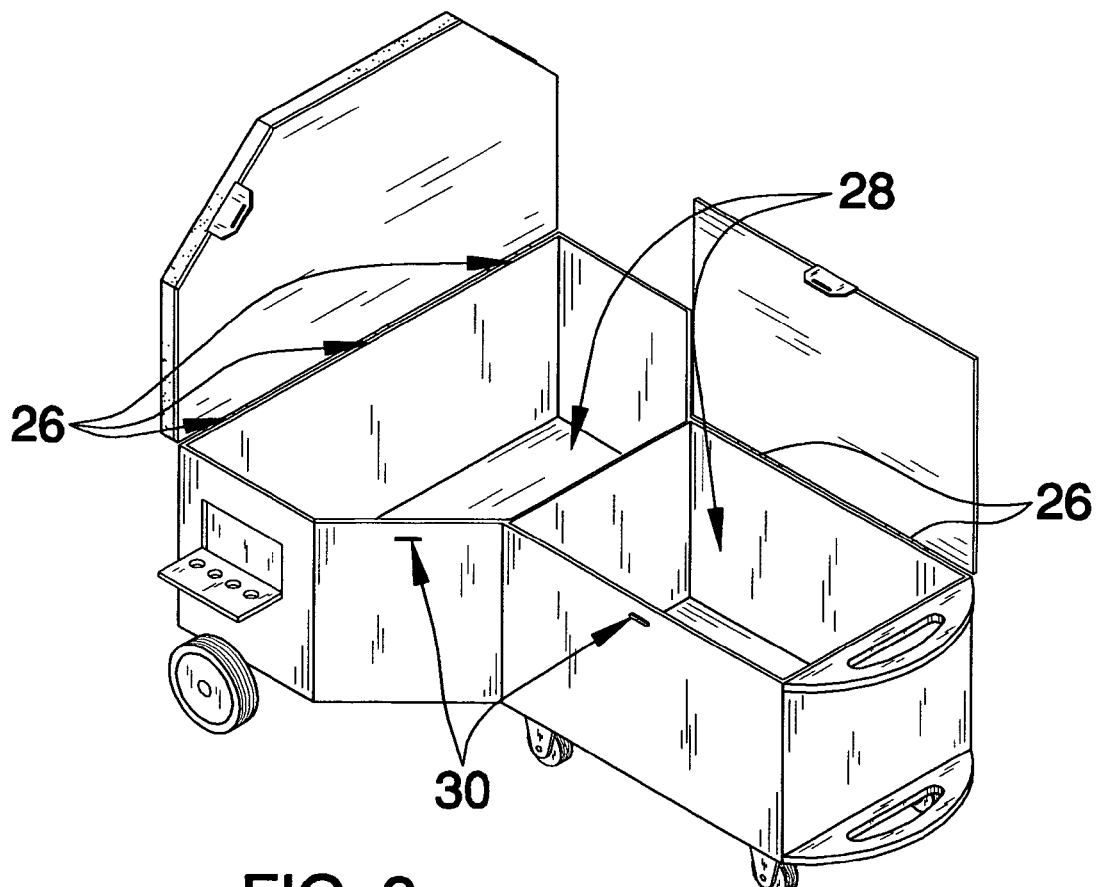
FIG. 2 is a perspective view of the claimed device with the lids open.

The present invention is a toolbox and organizer. It is mobile and provides new improvements to previous tool boxes. The present invention has a shape like a rocket ship in order to improve versatility. The construction will probably be of a durable material. Plastic or lightweight metal would be ideal. There will be two storage compartments 28, one on the front section and the other on the rear section. FIG. 2

Figure 1:
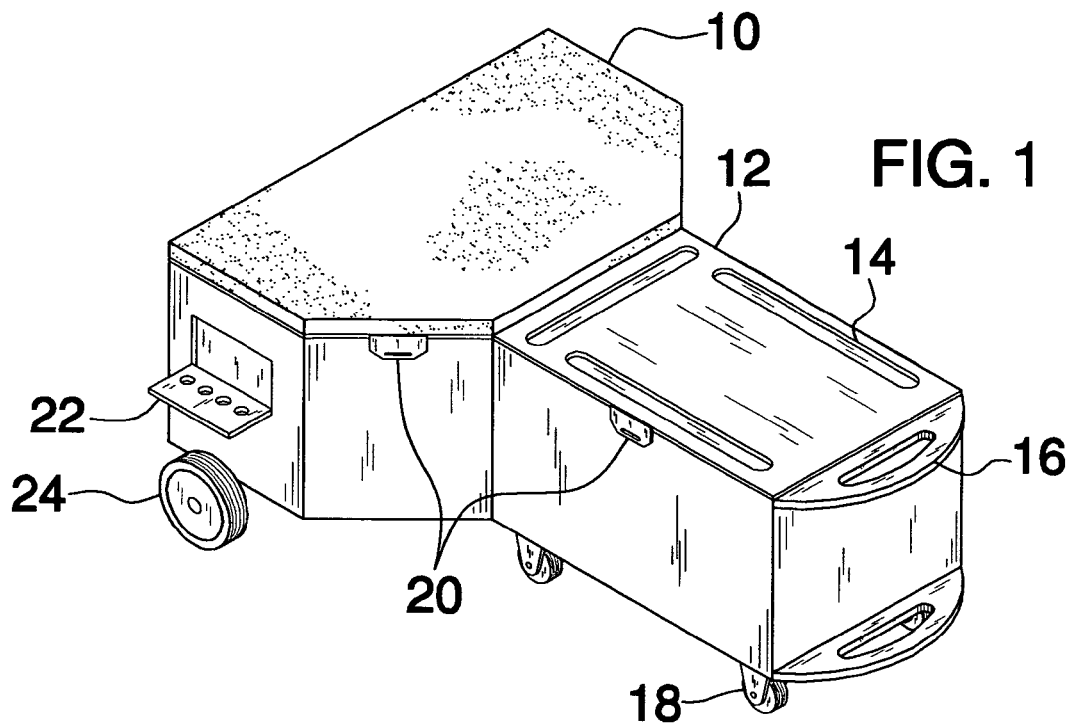
FIG. 1 is a perspective view of the claimed device.

The front portion of the present invention is basically the shape of a normal rectangular tool box. On the bottom of this front portion will be four swivel caster wheels 18. These wheels will be attached to the four corners of the bottom side. On the front face of the front portion there are two handles 16. FIG. 1 One handle will be attached to the top edge and one to the bottom edge. These handles will allow the user to pull the invention at a comfortable angle. The top of the front compartment will be covered by a lid 12 that is attached to an edge of the compartment through the use of hinges 26. FIG. 1, 2 On the outer face of the compartment lid 12 will be grooves 14 which will allow the user to store any loose screws or nails that might be in use. FIG. 1

Figure 3:
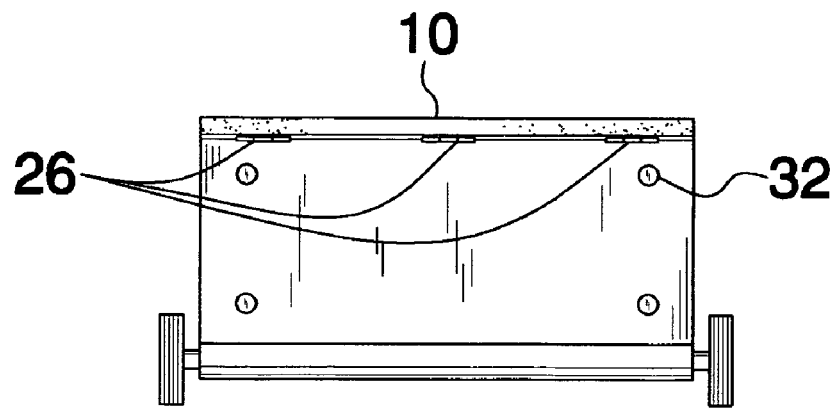
FIG. 3 is a rear view of the claimed device.

The rear portion of the present invention has a shape with along rear facing side, two parallel side panels, and two panels angled to connect the edges of the side panels to the rear edge of the front compartment. FIG. 1, 2 The side panels will be equipped with flip down screwdriver holders 22. FIGS. 1,2 Two large wheels 24 will be attached to the bottom of the rear compartment. FIG. 1 The top of the rear compartment will be covered by a lid with a padded seat 10. This lid is attached by hinges 26. FIGS. 2, 3 The lid and padded seat of the rear compartment are cut to be the same shape as the rear compartment. The lids of both the front and rear portions will have latches 20 and latch slots 30 which allow the user to secure the lids in a closed position. FIGS. 1, 2 The backward facing side of the rear portion will have small rubber boots 32 attached so that the invention may be stood upright on this rear face. FIG. 3

Figure 4:
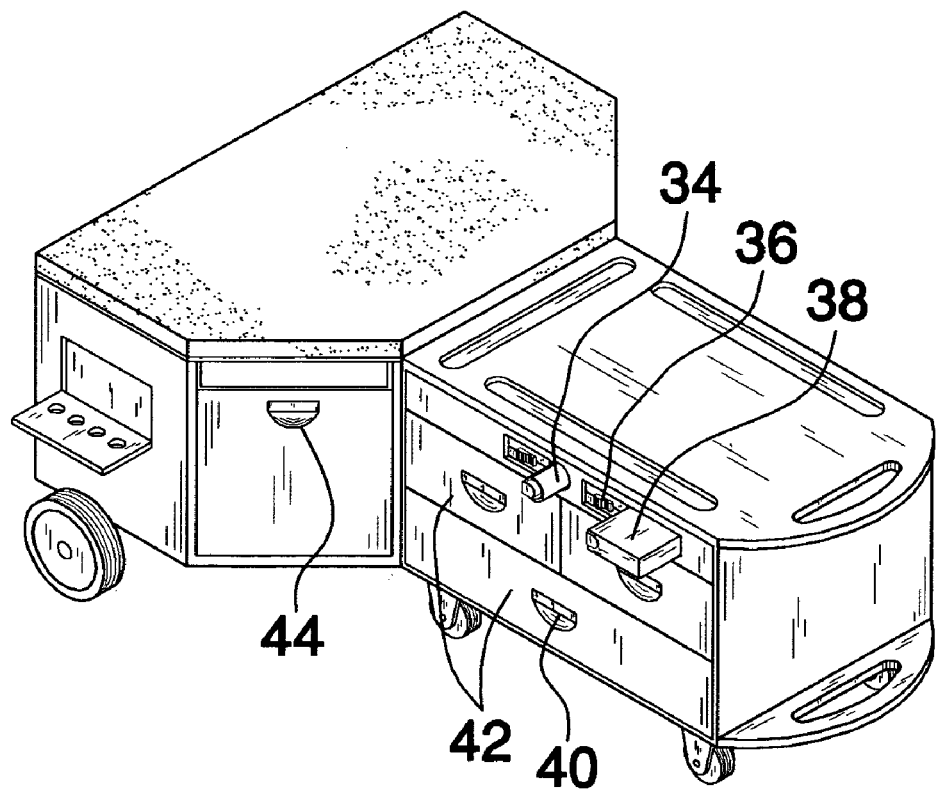
FIG. 4 is a perspective view of an alternative design of the claimed device as seen from the right side as viewed from the front.
Figure 5:
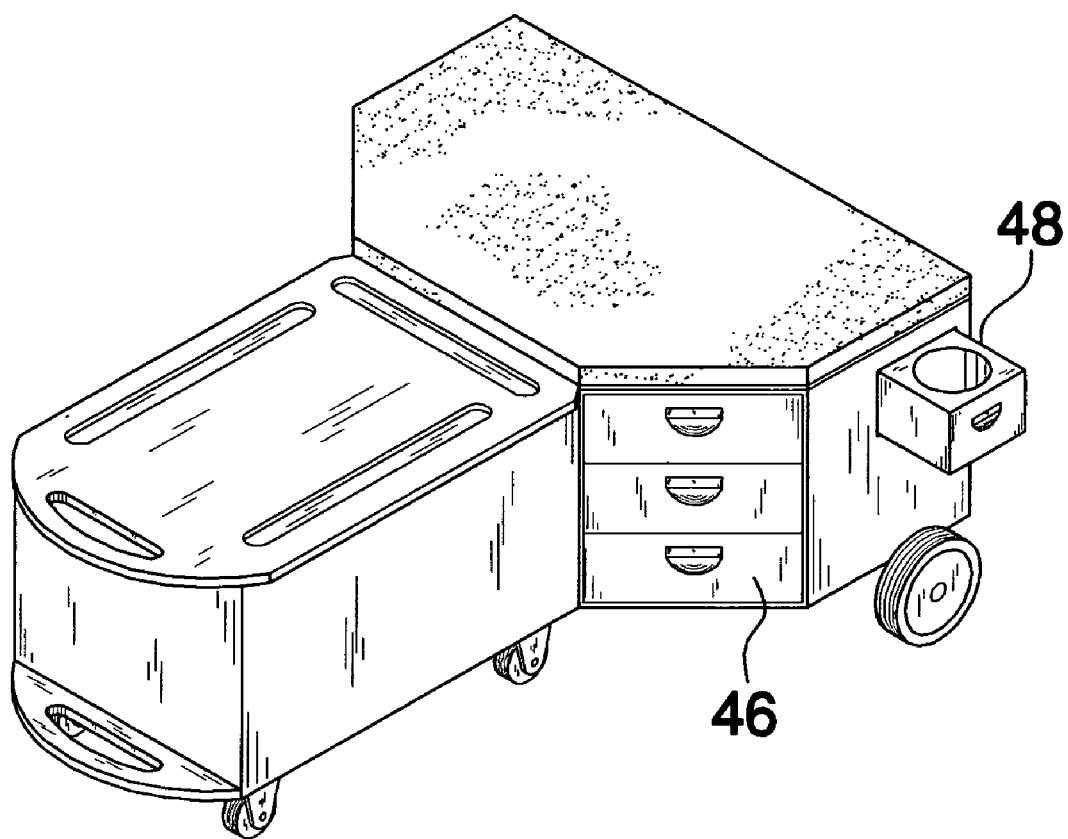
FIG. 5 is a perspective view of an alternative design of the claimed device as seen from the left side as viewed from the front.

An alternative design for the present invention as depicted by FIGS. 4 and 5 will allow for even more organization of tools. The angled panels of the rear portion will have tilt out drawers 44 or vertical pull out drawers 46. A pull out cup holder 48 is attached to the parallel sides of the rear portion. FIGS. 4,5 On the front portion, pull out drawers 42 are installed into the side panels. All of these drawers are equipped with handle grips 40 on their face in order to be more user friendly. Near the top of the side wall of the front portion will be a round hole 34 for insertion of a pipe when a pipe would need to be cut or transported. Next to that hole will be a recessed tape measure holder 36 and a rectangular hole to insert a board in order to transport or cut. FIG. 4

It is anticipated that the front portion and rear portion are constructed as one piece.

The inventor claims:

1. A device allowing a portable work area comprising:
   a. a front portion and a rear portion;
   wherein the front portion and rear portion are constructed as one piece;
   wherein the front portion and rear portion have defined sides, defined top surfaces and a bottom surface;
   wherein the front portion and rear portion have a flat surface made of durable material on the respective top surfaces;
   wherein the flat surface has a wide section and a narrow section to accommodate a narrow storage compartment and a wide storage compartment;
   wherein the narrow storage compartment is built upon the narrow section of the flat surface;
   wherein the narrow storage compartment has a plurality of vertical parallel side panels, and a vertical front panel;
   wherein the wide compartment has a wide vertical rear panel, a plurality of parallel vertical side panels, and a plurality of vertical angled panels connecting the front edge of the second parallel panels to the rear edges of the first parallel panels;
   d. a vertical panel acting as a divider between the narrow and wide compartments;
   e. a narrow lid;
   wherein a narrow lid substantially covers an open top of the narrow storage compartment;
   wherein a plurality of grooves are located on the top face of the narrow lid;
   f. a wide lid;
   wherein the wide lid substantially covers the open top of the wide compartment;
   g. padded cushion material;
   wherein the padded cushion material is substantially the same shape as the wide lid;
   wherein the padded cushion material is fixedly attached to top of the wide lid;
   h. hinges;
   wherein a plurality of hinges attach the wide lid to the rear panel;
   wherein a plurality of hinges attach the narrow lid to a desired parallel side panel;
   i. a plurality of wheels;
   wherein the wheels are fixedly attached to the wide compartment;
   j. a plurality of swiveling wheels;
   wherein the swiveling wheels are fixedly attached to the narrow compartment;
   k. a plurality of handles;
   wherein the handles are fixedly attached to the front facing portion of said narrow compartment;
   l. a plurality of latching devices and receptacles;
   wherein said latches are fixedly attached to the lids and the receptacles are fixedly attached to the corresponding vertical panels;
   wherein the latches and receptacles allow the lids to be secured in a closed position;
   m. a plurality of resting devices;
   wherein the resting devices are fixedly attached to the rear panel of the wide compartment; and
   wherein the resting devices allow the claimed work area to be positioned vertically on its end.

2. The device as described in claim 1 further comprising a screwdriver holder flipably incorporated into a vertical panel of the device.

3. The device as described in claim 1 further comprising a pull-out beverage holder slidably attached to a vertical panel of the device.

4. The device as described in claim 1 further comprising a predetermined number of tilt out storage compartments;
   wherein said storage compartments are incorporated into predetermined vertical panels of the device;
   wherein said storage compartments flip open as if positioned on an axle; and
   wherein said storage compartments have gripping devices.

5. The device as described in claim 1 further comprising a plurality of slidably attached drawers;
   wherein said drawers are incorporated into predetermined locations in the vertical panels of the wide and narrow compartments;
   wherein said drawers have gripping devices.

6. The device as described in claim 1 further comprising a circular hole drilled into a predetermined location on a vertical panel of the device.

7. The device as described in claim 1 further comprising a predetermined number of recessed rectangular openings incorporated into the vertical panels of the device;
   wherein the recessed openings are capable of holding any number of desired tools and materials.

8. The device as described in claim 1 further comprising a means to elevate the work surface.

9. The device as described in claim 1 wherein the device composed of metal.

10. The device as described in claim 1 wherein the device is composed of plastic.

* * * * *